(12) United States Patent
Horii

(10) Patent No.: US 10,889,963 B2
(45) Date of Patent: Jan. 12, 2021

(54) WORKING MACHINE

(71) Applicant: KUBOTA CORPORATION, Osaka (JP)

(72) Inventor: Hiroshi Horii, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 16/228,561

(22) Filed: Dec. 20, 2018

(65) Prior Publication Data

US 2019/0119884 A1 Apr. 25, 2019

Related U.S. Application Data

(63) Continuation of application No. PCT/JP2017/045783, filed on Dec. 20, 2017.

(30) Foreign Application Priority Data

Dec. 22, 2016 (JP) .................................. 2016-250144

(51) Int. Cl.
*E02F 9/22* (2006.01)
*E02F 9/20* (2006.01)
(Continued)

(52) U.S. Cl.
CPC .............. *E02F 9/22* (2013.01); *B62D 11/005* (2013.01); *B62D 11/06* (2013.01); *E02F 3/32* (2013.01);
(Continued)

(58) Field of Classification Search
CPC .. E02F 9/22; E02F 9/225; B62D 11/06; F15B 11/02
(Continued)

(56) References Cited

U.S. PATENT DOCUMENTS

2009/0057049 A1 3/2009 Yamada et al.
2012/0067443 A1 3/2012 Horii
(Continued)

FOREIGN PATENT DOCUMENTS

CN 1676395 A 10/2005
CN 101158167 A 4/2008
(Continued)

OTHER PUBLICATIONS

Extended European Search Report of Application No. 17882895.0 dated Jul. 9, 2020.

*Primary Examiner* — Thomas E Lazo
*Assistant Examiner* — Daniel S Collins
(74) *Attorney, Agent, or Firm* — Birch, Stewart, Kolasch & Birch, LLP

(57) ABSTRACT

A working machine includes a hydraulic pump, a first traveling device to be driven by a first traveling hydraulic actuator, a second traveling device to be driven by a second traveling hydraulic actuator, a first output tube to connect a first output port of the hydraulic pump to the first traveling hydraulic actuator, a second output tube to connect a second output port of the hydraulic pump to the second traveling hydraulic actuator, a first operation device to operate the first traveling device, a second operation device to operate the second traveling device and a correction mechanism to equalize a driving force of the first traveling hydraulic actuator and another driving force of the second traveling hydraulic actuator when the first operation device and the second operation device are operated each at same operation extents to perform a straight-traveling operation.

13 Claims, 9 Drawing Sheets

(51) Int. Cl.
*B62D 11/00* (2006.01)
*B62D 11/06* (2006.01)
*E02F 3/32* (2006.01)
*F15B 11/20* (2006.01)
*E02F 9/02* (2006.01)
*F15B 11/00* (2006.01)
*F15B 11/02* (2006.01)
*F15B 11/08* (2006.01)
*F15B 11/17* (2006.01)
*E02F 3/96* (2006.01)

(52) U.S. Cl.
CPC .............. *E02F 9/02* (2013.01); *E02F 9/2004* (2013.01); *E02F 9/225* (2013.01); *E02F 9/2225* (2013.01); *E02F 9/2232* (2013.01); *E02F 9/2271* (2013.01); *F15B 11/00* (2013.01); *F15B 11/02* (2013.01); *F15B 11/08* (2013.01); *F15B 11/17* (2013.01); *F15B 11/20* (2013.01); *E02F 3/964* (2013.01); *E02F 9/2285* (2013.01); *E02F 9/2292* (2013.01); *E02F 9/2296* (2013.01)

(58) Field of Classification Search
USPC .......................................................... 60/421
See application file for complete search history.

(56) References Cited

U.S. PATENT DOCUMENTS

2012/0330516 A1 12/2012 Horii
2016/0115974 A1* 4/2016 Takahashi ............... F15B 11/17
60/421

FOREIGN PATENT DOCUMENTS

| CN | 102733443 A | 10/2012 |
| CN | 102782338 A | 11/2012 |
| EP | 0 709 579 A2 | 5/1996 |
| EP | 1 803 630 A1 | 7/2007 |
| JP | 61-211505 | 9/1986 |
| JP | 5480847 B2 | 4/2014 |
| JP | 5528276 B2 | 6/2014 |
| JP | 2015-218537 A | 12/2015 |
| WO | WO 2007/132687 A1 | 11/2007 |

\* cited by examiner

WORKING MACHINE

CROSS-REFERENCE TO RELATED APPLICATIONS

The present application is a continuation application of International Application No. PCT/JP 2017/045783, filed Dec. 20, 2017, which claims priority to Japanese Patent Application No. 2016/250144, filed Dec. 22, 2016. The contents of these applications are incorporated herein by reference in their entirety.

BACKGROUND OF THE INVENTION

Field of the Invention

The present invention relates to a working machine such as a backhoe.

Description of Related Art

The working machines disclosed in Japanese Patent Publication No. 5480847 and Japanese Patent Publication No. 5528276 are conventionally known.

Each of the working machines disclosed in Japanese Patent Publication No. 5480847 and Japanese Patent Publication No. 5528276 has a traveling independent valve. This traveling independent valve is configured to be switched between a confluent position and a supply position, the confluent position allowing the pressured fluids from the variable displacement hydraulic pumps of the split flow type to be confluent with each other, the supply position allowing the pressured fluids from the variable displacement hydraulic pumps to be independently supplied to both of the right-traveling hydraulic actuator configured to drive the right traveling device and the left-traveling hydraulic actuator configured to drive the left traveling device, and thus the switching of the traveling independent valve improves the steering performance, that is, the traveling performance of the working machine.

In the working machines disclosed in Japanese Patent Publication No. 5480847 and Japanese Patent Publication No. 5528276, the configuration is such that the right traveling device (the right-traveling hydraulic actuator) is operated by the right operation device and the left traveling device (the left-traveling hydraulic actuator) is operated by the left operation device, and in the case where the right control device and the left control device are operated simultaneously by the same operation amount, the working machines travel straight ahead.

In addition, in the working machine disclosed in Japanese Patent Publication No. 5480847, the right fluid tube configured to supply the hydraulic fluid to the right-traveling hydraulic actuator and the left fluid tube configured to supply the hydraulic fluid to the left-traveling hydraulic actuator are connected by a bypass fluid tube, and the bypass fluid tube is provided with a traveling bypass valve. The traveling bypass valve is configured to be switched between a first position, a second position, and a blocking position, the first position allowing the pressured fluid to flow from the right-traveling hydraulic actuator side to the left-traveling hydraulic actuator side, the second position allowing the pressured fluid to flow from the left-traveling hydraulic actuator side to the right-traveling hydraulic actuator side, the blocking position blocking the bypass fluid tube. In this manner, according to the work machine disclosed in Japanese Patent Publication No. 5480847, in the case where the left turn or the right turn is performed under the situation where the vehicle is, for example, traveling on a downhill slope, the traveling bypass valve is switched to the first position or the second position, the hydraulic fluid to be supplied to one of the right fluid tube and the left fluid tube, which is arranged on the inner side, is released to the other one of the fluid tubes, and thereby the traveling performance is improved.

In addition, according to the technique disclosed in Japanese Patent Publication No. 5528276, in the case where the right control device and the left control device are operated approximately to the maximum operation amount (to the full stroke), the direction switching valve for the left traveling device and the direction switching valve for the right traveling device are provided with the mechanisms configured to connect the supply fluid tube for the right-traveling hydraulic actuator and the supply fluid tube for the left-traveling hydraulic actuator to each other via the throttles. In this manner, in the technique disclosed in Japanese Patent Publication No. 5528276, improvement in the straight-driveability of traveling at the full speed traveling is provided.

SUMMARY OF THE INVENTION

A working machine according to one aspect of the present invention includes a hydraulic pump, a first traveling device to be driven by a first traveling hydraulic actuator, a second traveling device to be driven by a second traveling hydraulic actuator, a first output tube to connect a first output port of the hydraulic pump to the first traveling hydraulic actuator, a second output tube to connect a second output port of the hydraulic pump to the second traveling hydraulic actuator, a first operation device to operate the first traveling device, a second operation device to operate the second traveling device, and a correction mechanism to equalize a driving force of the first traveling hydraulic actuator and another driving force of the second traveling hydraulic actuator when the first operation device and the second operation device are operated each at same operation extents to perform a straight-traveling operation.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
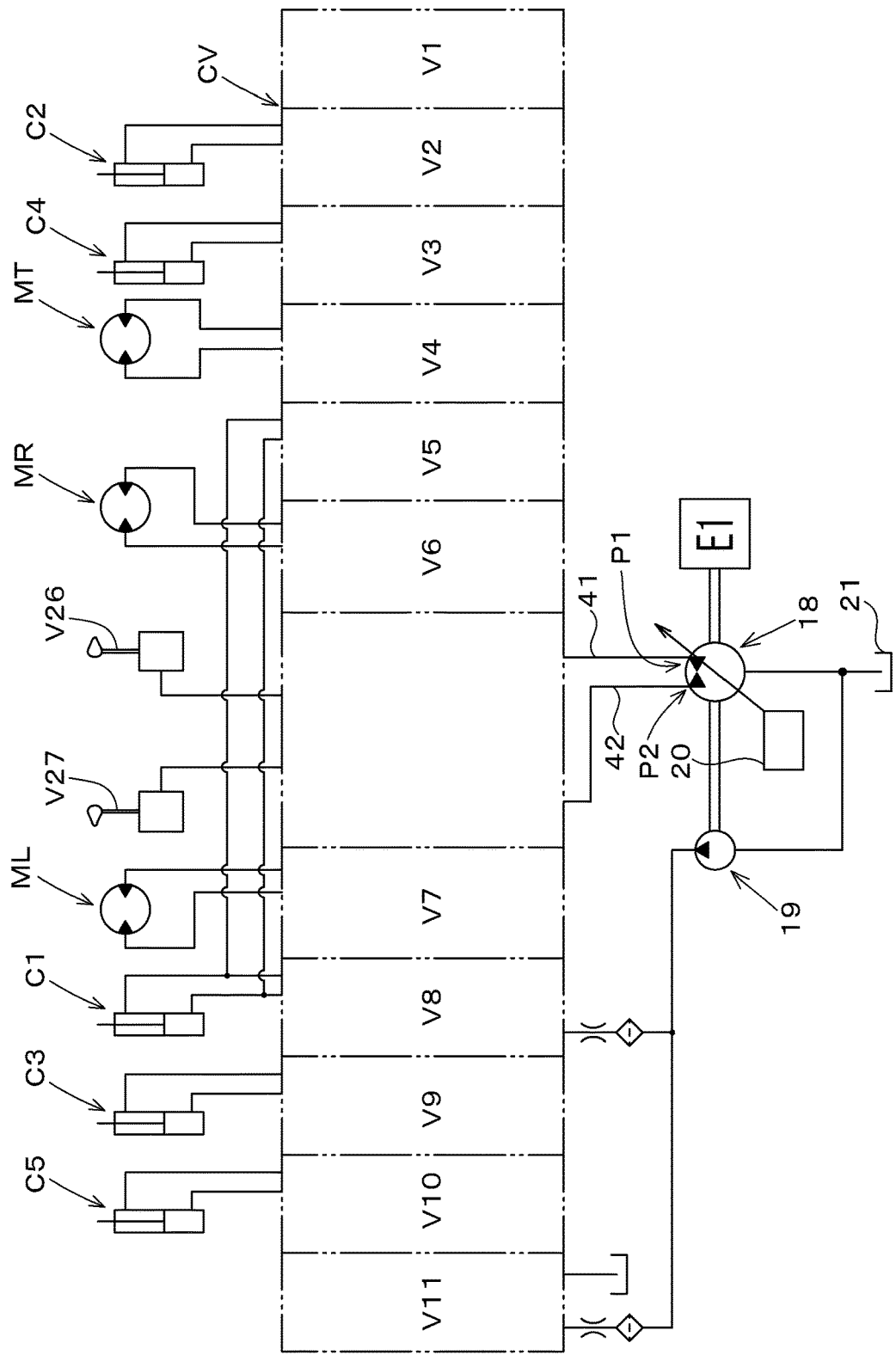
FIG. 1 is a schematic view illustrating a configuration of a hydraulic system according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

First Embodiment

Figure 9:
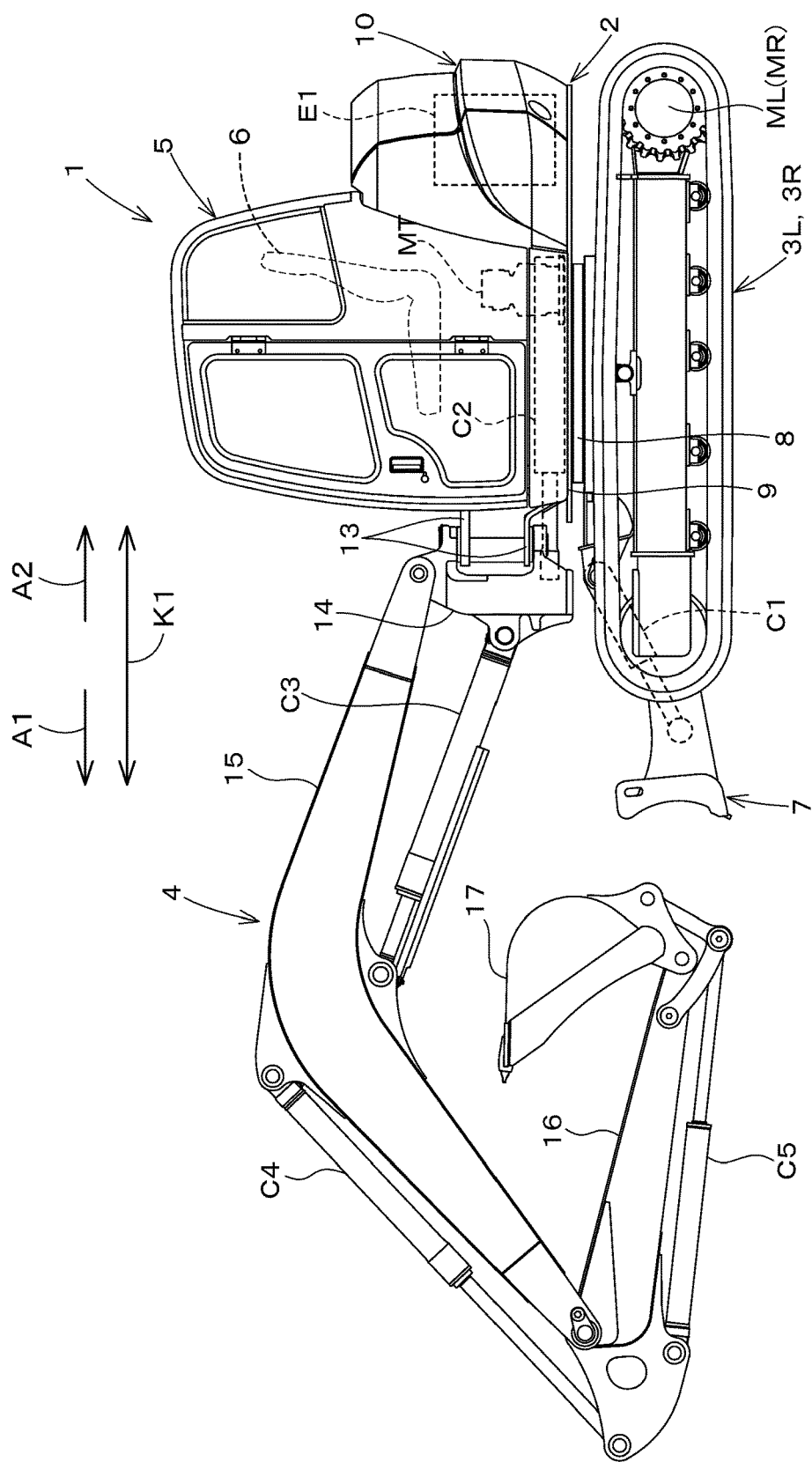
FIG. 9 is an overall side view illustrating a working machine according to the embodiments.

FIG. 9 is a schematic side view showing an overall configuration of a working machine 1 according to the present embodiment. In the present embodiment, a backhoe that is a swiveling working machine is exemplified as the working machine 1.

The overall configuration of the working machine 1 will be described at first.

As shown in FIG. 9, the working machine 1 includes a machine body (a turn base) 2, a first traveling device 3R, a second traveling device 3L, and a working device 4. A cabin 5 is mounted on the machine body 2. In a room of the cabin 5, an operator seat (a seat) 6 on which a driver (an operator) is seated is provided.

In the explanation of the present embodiment, the front side of the operator seated on the operator seat 6 of the working machine 1 (the direction indicated by the arrowed line A1 in FIG. 9) corresponds to the front, the rear side of the operator (the direction indicated by the arrowed line A2 in FIG. 9) corresponds to the rear, the left side of the operator (the front surface side of FIG. 9) corresponds to the left, and the right side of the operator (the back surface side of FIG. 9) corresponds to the right. In addition, the horizontal direction which is a direction orthogonal to the front-rear direction K1 will be described as the machine width direction in the explanation.

As shown in FIG. 9, the first traveling device 3R is provided on the right side with respect to the machine body 2, and the second traveling device 3L is provided on the left side with respect to the machine body 2. In the present embodiment, each of the first traveling device 3R and the second traveling device 3L is a crawler type traveling mechanisms (a crawler traveling device). The first traveling device 3R and the second traveling device 3L are respectively driven by traveling motors MR and ML each of which is constituted of a traveling hydraulic actuator. A dozer device 7 is attached to each of the front portions of the first traveling device 3R and the second traveling device 3L. The dozer device 7 stretches and shortens the dozer cylinder C1 to move upward and downward (raise and lower the blade).

The machine body 2 is supported on a traveling frame so as to be turnable around a vertical axis (an axis extending upward and downward) via a turn bearing 8. The machine body 2 is driven to be turned by a turning motor MT constituted of a hydraulic motor (a hydraulic actuator). The machine body 2 has a weight 10 and a base plate (hereinafter referred to as a turning base plate) 9 which is turned around a vertical axis. The turning base plate is formed of a steel plate or the like, and is coupled to the turn bearing 8. The weight 10 is provided in the rear portion of the machine body 2. A prime mover E1 is mounted on the rear portion of the machine body 2. The prime mover E1 is constituted of an engine. The prime mover E1 may be constituted of an electric motor or of a hybrid type having the engine and the electric motor.

The machine body 2 has a support bracket 13 in the front portion thereof, being arranged slightly rightward from the center in the machine width direction. A swing bracket 14 is attached to the support bracket 13 so as to be swingable about a vertical axis. A working device 4 is attached to the swing bracket 14.

The working device 4 has a boom 15, an arm 16, and a bucket (a working tool) 17. The base portion of the boom 15 is pivotally attached to the swing bracket 14 so as to be rotatable about a horizontal axis (an axis extending in the machine width direction). In this manner, the boom 15 is configured to be swung upward and downward. The arm 16 is pivotally attached to the tip end side of the boom 15 so as to be rotatable about the horizontal axis. In this manner, the arm 16 is configured to be swung forward and backward or upward and downward. The bucket 17 is provided on the tip end side of the arm 16 so as to perform a shoveling operation and a dumping operation. Instead of or in addition to the bucket 17, the working machine 1 is configured to mount another working tool (a hydraulic attachment) which is configured to be driven by the hydraulic actuator. Examples of other working tools include a hydraulic breaker, a hydraulic crusher, an angle bloom, an earth auger, a pallet fork, a sweeper, a mower, and a snow blower.

The swing bracket 14 is configured to be swung by the stretching and shortening of a swing cylinder C2 provided in the machine body 2. The boom 15 is configured to be swung by the stretching and shortening of the boom cylinder C3. The arm 16 is configured to be swung by the stretching and shortening of the arm cylinder C4. The bucket 17 is capable of performing the shoveling operation and the dumping operation due to the stretching and shortening of a bucket cylinder (a working tool cylinder) C5. The working hydraulic actuators such as the dozer cylinder C1, the swing cylinder C2, the boom cylinder C3, the arm cylinder C4, the bucket cylinder C5 are each constituted of the hydraulic cylinders.

Next, a hydraulic system of the working machine will be described below.

As shown in FIG. 1, the hydraulic system of the working machine includes a valve device CV configured to control the various types of hydraulic actuators ML, MR, MT, and C1 to C5, a main pump (a first hydraulic pump) 18 configured to supply the operation fluid to operate the various types of hydraulic actuators ML, MR, MT, and C1 to C5, and a sub pump (a second hydraulic pump) 19 configured to supply the signal pressured fluid such as a pilot pressure and a detection signal.

The first hydraulic pump 18 and the second hydraulic pump 19 are driven by the engine E1 mounted on the turning base plate 9. The first hydraulic pump 18 is constituted of a variable displacement axial pump of swash plate type having the function of a uniform flow-rate double pump configured to output uniform amounts of the pressured fluids from two output ports P1 and P2 independent from each other. More specifically, the first hydraulic pump 18 employs a hydraulic pump of split flow type having a mechanism configured to alternately output the pressured fluid from one piston/cylinder barrel kit to an output groove formed inside and outside the valve plate. The second hydraulic pump 19 is constituted of a gear pump of a constant displacement type. Meanwhile, the output port P1 of the first hydraulic pump 18 from which the pressured fluid is outputted is referred to as a first pressured fluid output port P1, and the output port P2 of the first hydraulic pump 18 is referred to as a second pressured fluid output port P2.

The valve device CV is constituted by arranging the control valves V1 to V11 configured to control the various types of the hydraulic actuators ML, MR, MT, and C1 to C5, and inlet blocks for taking the pressured fluid in one direction. In the present embodiment, the valve device CV is constituted by sequentially arranging a first SP control valve V1 for controlling the hydraulic attachment, a swing control valve V2 for controlling the swing cylinder C2, an arm control valve V3 for controlling the arm cylinder C4, a turn control valve V4 for controlling the turn motor MT, a first dozer control valve V5 for controlling the dozer cylinder C1, a right traveling control valve V6 for controlling the first traveling hydraulic actuator (a traveling motor MR) of the first traveling device 3R, an inlet block for taking the pressured fluid, a left traveling control valve V7 for controlling the second traveling hydraulic actuator (a traveling motor ML) of the second traveling device 3L, a second dozer control valve V8 for controlling the dozer cylinder C1, a boom control valve V9 for controlling the boom cylinder C3, a bucket control valve V10 for controlling the bucket cylinder C5, a second SP control valve V11 for controlling another hydraulic attachment and by connecting the valves and the inlet blocks to each other.

Figure 2:
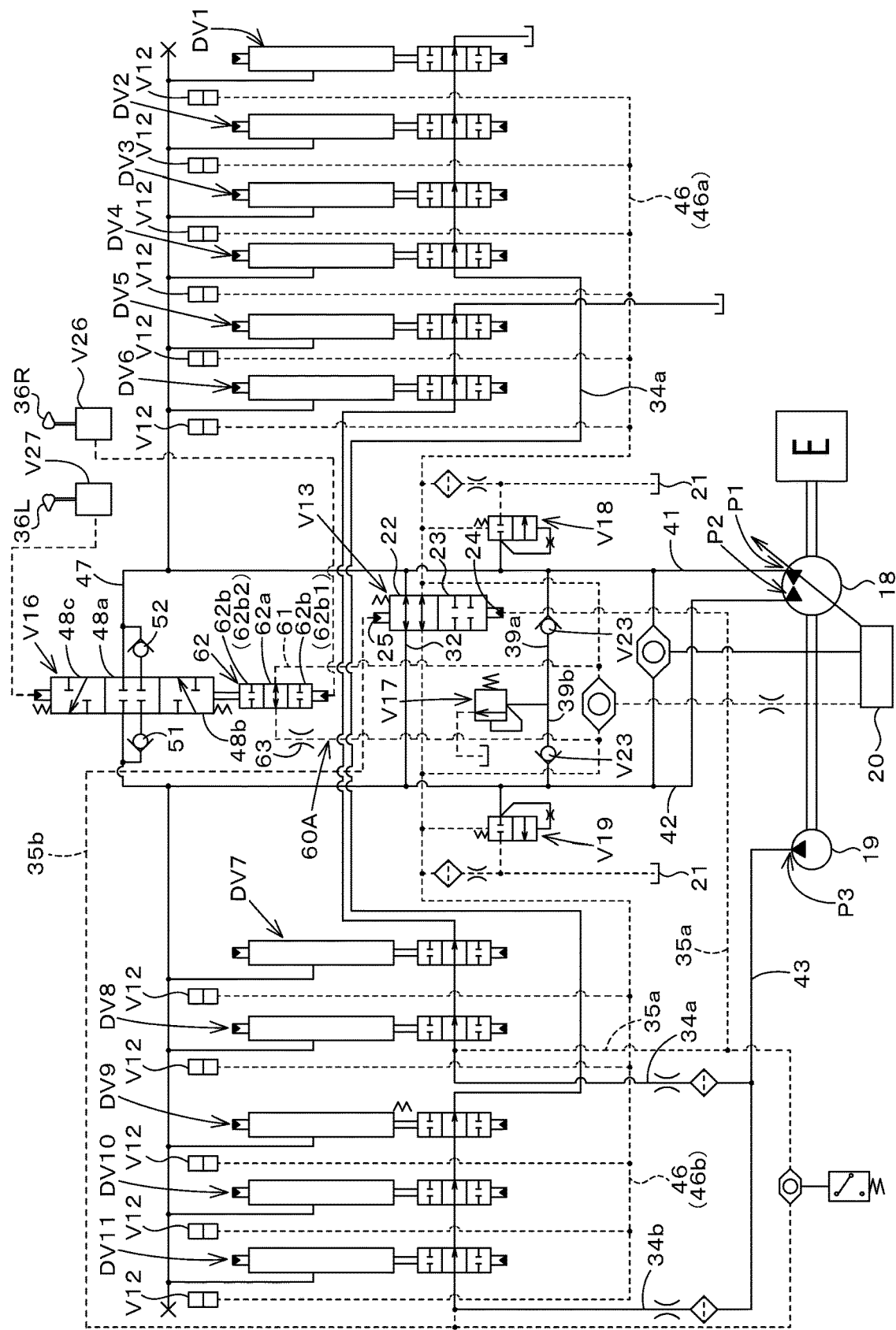
FIG. 2 is a schematic view illustrating a hydraulic circuit of the hydraulic system according to the first embodiment.
Figure 4:
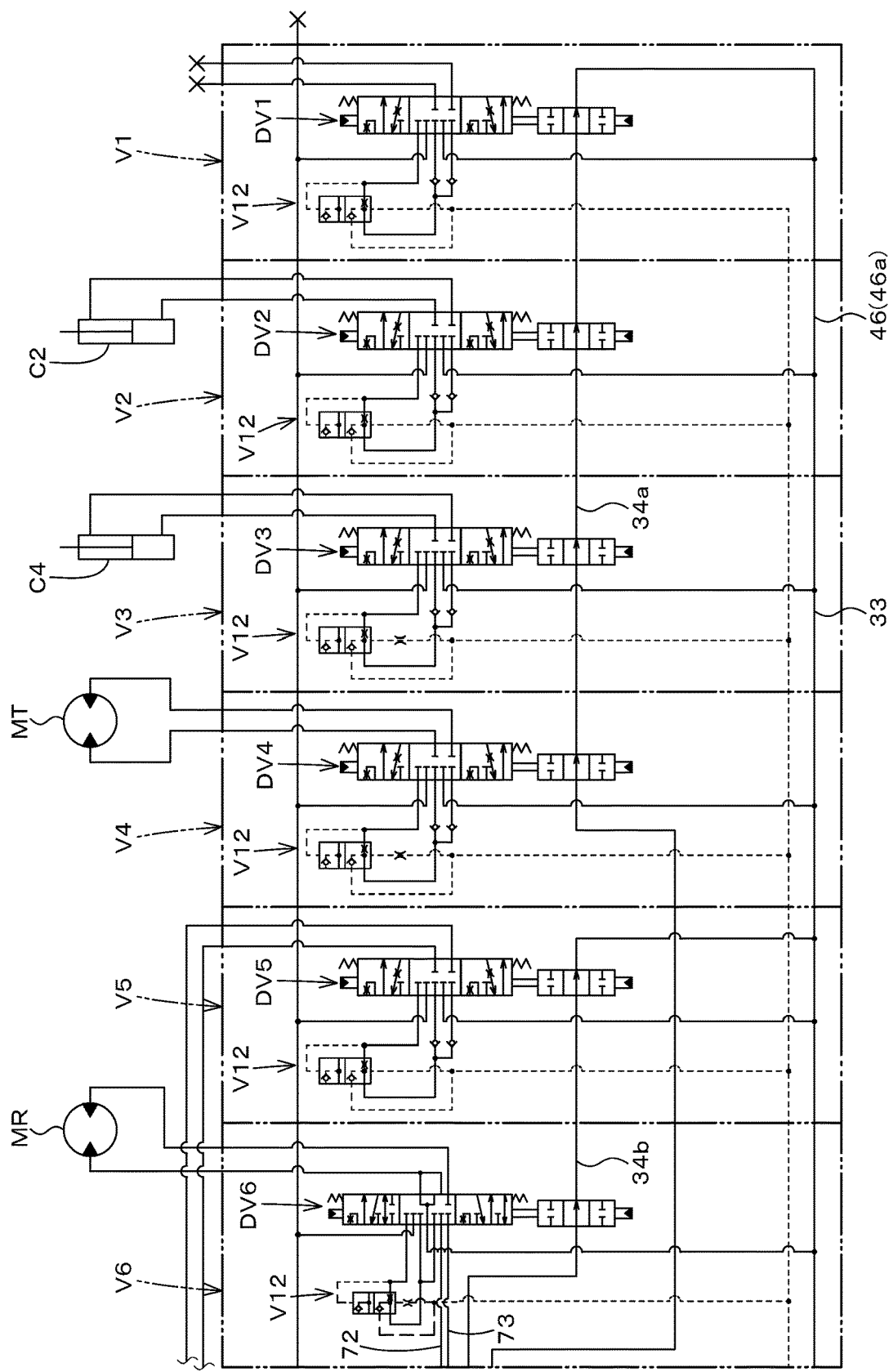
FIG. 4 is a view illustrating a hydraulic circuit relating to a right traveling control valve, a first dozer control valve, a turn control valve, an arm control valve, a swing control valve, and a first SP control valve according to the first embodiment.
Figure 5:
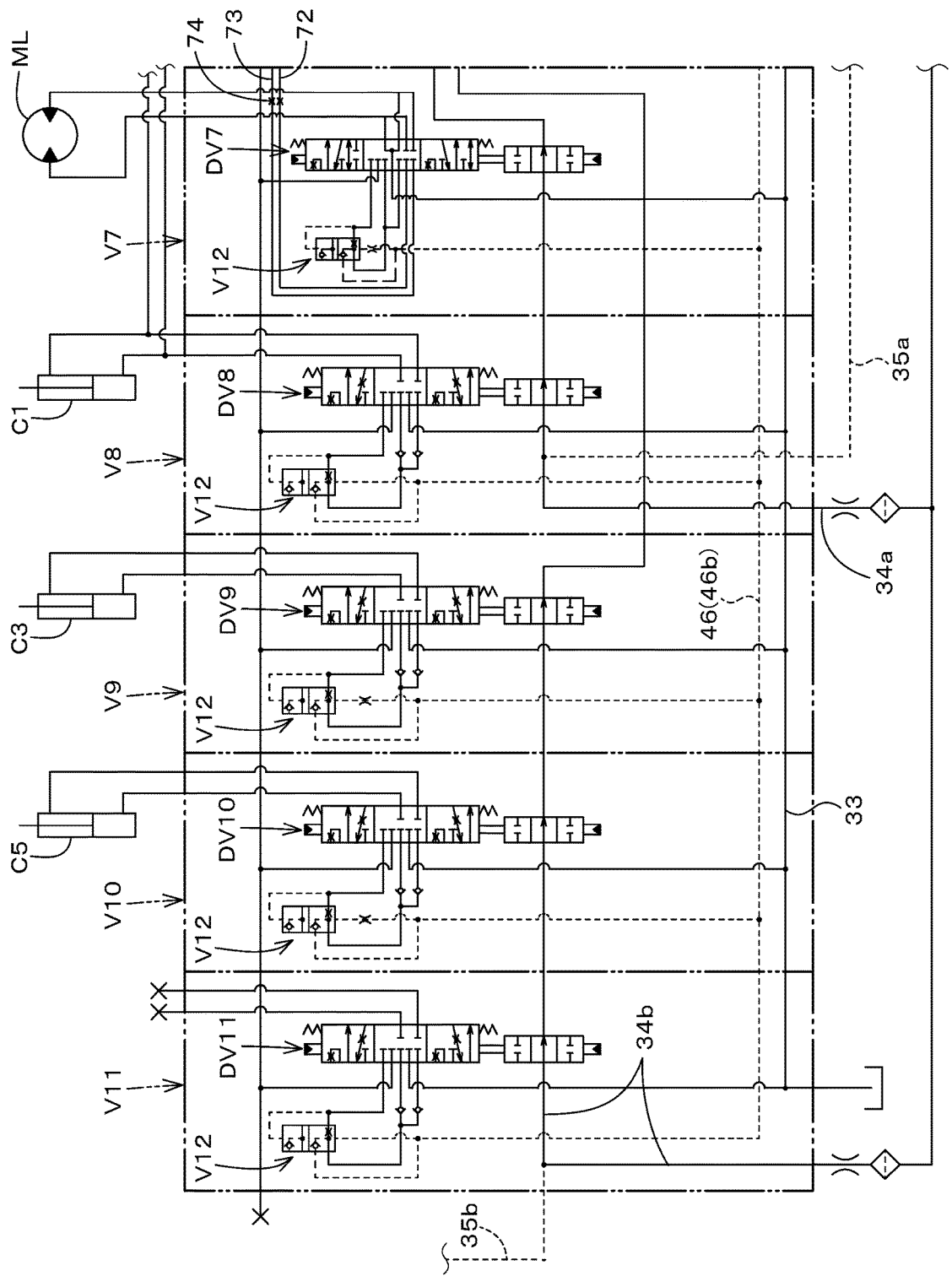
FIG. 5 is a view illustrating a hydraulic circuit relating to a left traveling control valve, a first dozer control valve, a turn control valve, an arm control valve, a swing control valve, and a first SP control valve according to the first embodiment.

As shown in FIG. 2, FIG. 4, and FIG. 5, the control valves V1 to V11 include direction switching valves DV1 to DV11 and a pressure compensation valve V12 in the valve body. The directional control valves DV1 to DV11 switch the direction of the pressured fluid with respect to the hydraulic actuators ML, MR, MT, and C1 to C5 which are control targets, and the pressure compensation valve V12 is arranged on a downstream side from the directional control valves DV1 to DV11 in the pressured fluid supply and on an upper stream side from the hydraulic actuators ML, MR, MT, and C1 to C5 in the pressured fluid supply.

The direction switching valves DV1 to DV11 of the control valves V1 to V11 and the traveling independent valve V13 are constituted of the switching valves of direct-acting spool type and of the switching valves of pilot operation type that is switched by the pilot pressure. In addition, the directional control valves DV1 to DV11 of the control valves V1 to V11 are configured to move the spools in proportion to the operation amount of the operation means for operating the directional control valves DV1 to DV11, and supplies the pressured fluid of an amount proportional to a movement amount of the spools to the hydraulic actuators ML, MR, MT, C1 to C5 which are the control targets. In addition, the direction switching valve DV5 of the first dozer control valve V5 and the direction switching valve DV8 of the second dozer control valve V8 are simultaneously operated by a single operating member such as a dozer lever for operating the dozer device 7.

The valve device CV incorporates a traveling independent valve V13, a PPS signal shuttle valve V14, a PLS signal shuttle valve V15, a traveling bypass valve V16, and a relief valve V17.

A first output tube 41 is connected to the first output port P1 of the first hydraulic pump 18, and a second output tube 42 is connected to the second output port P2. The first output tube 41 is connected to the direction switching valves DV1 to DV6. The second output tube 42 is connected to the direction switching valves DV7 to DV11. The first output tube 41 and the second output tube 42 are mutually connected to each other via a communication tube 32 crossing the traveling independent valve V13. Meanwhile, a drain fluid tube 33 for returning the pressured fluid to the tank 21 is provided striding over from the first SP control valve V1 to the second control valve V11.

The traveling independent valve V13 is constituted of a pilot operation switching valve configured to be switched by the pilot pressure. The traveling independent valve V13 is configured to be switched between a confluent position 22 and an independent supply position 23, the confluent position 22 allowing the pressured fluid to flow through the communication tube 32, the independent supply position 23 blocking the pressured fluid from flowing through the communication tube 32, and is pushed by a spring toward a direction to be switched to the confluent position 22. Thus, when the traveling independent valve V13 is switched to the confluent position 22, the outputted fluid from the first output port P1 and the outputted fluid from the second output port P2 are confluent with each other, and are respectively supplied to the direction switching valves DV1 to DV11 of the control valves V1 to V11.

When the traveling independent valve V13 is switched to the independent supply position 23, the outputted fluid from the first output port P1 is supplied to the direction switching valve DV6 of the right traveling control valve V6, the direction switching valve DV5 of the first dozer control valve V5, the direction switching valve DV4 of the first dozer control valve V5, the direction control valve DV3 of the arm control valve V3, the direction control valve DV2 of the swing control valve V2, and the direction control valve DV1 of the first SP control valve V1, and the pressured fluid from the second output port P2 is supplied to the direction switching valve DV7 of the left traveling control valve V7, the direction switching valve DV8 of the second dozer control valve V8, the direction switching valve DV9 of the boom control valve V9, the direction switching valve DV10 of the bucket control valve V10, and the direction switching valve DV11 of the second SP control valve V11.

A third output tube 43 is connected to the second hydraulic pump 19. A first detection fluid tube 34a and a second detection fluid tube 34b are connected to the third output tube 43. The first detection fluid tube 34a is connected to the direction switching valves DV8, DV7, DV6, and DV5 and to the drain fluid tube 33. A first signal fluid tube 35a is connected to the first detection fluid tube 34a on the upstream side of the direction switching valve DV8, and the first signal fluid tube 35a is connected to one of the pressure receiving portions 24 of the traveling independent valve V13.

The second detection fluid tube 34b is connected to the direction switching valves DV11, DV10, DV9, DV4, DV3, DV2, and DV1 and to the drain fluid tube 33. A second signal fluid tube 35b is connected to the second detection fluid tube 34b on the upstream side of the direction switching valve DV11 of the second SP control valve V11, and the second signal fluid tube 35b is connected to the other one of the pressure receiving portions 25 of the traveling independent valve V13.

As described above, according to the traveling independent valve V13, in the case where the direction switching valves DV1 to DV11 of the control valves V1 to V11 are in the neutral positions, is can be said that the traveling independent valve V13 is held at the confluent position 22 by the force of the spring. And, when any one of the direction switching valves DV6, DV7, DV5, and DV8 of the right traveling control valve V6, the left traveling control valve V7, the first dozer control valve V5, and the second dozer control valve V8 is operated from the neutral position, the fluid pressures are generated in the first detection fluid tube 34a and the first signal fluid tube 35a so that the traveling independent valve V13 is switched from the confluent position 22 to the independent supply position 23.

In addition, when any one of the direction control valves DV11. DV10, DV9, DV4, DV3, DV2, DV1 of the second SP control valve V11, the bucket control valve V10, the boom control valve V9, the turn control valve V4, the arm control valve V3, the swing control valve V2, and the first SP control valve V1 is operated from the neutral position, the fluid pressures are generated in the second detection fluid tube 34b and the second signal fluid tube 35b so that the traveling independent valve V13 is switched from the independent supply position 23 to the confluent position 22.

The relief valve V17 of the system is shared with the first output tube 41 and the second output tube 42. That is, the starting end of the first relief fluid tube 39a is connected to the first output tube 41, the starting end of the second relief fluid tube 39b is connected to the second output tube 42, the terminal ends of the first relief fluid tube 39a and second relief fluid tube 39b are mutually connected to each other, a drain tube communicating with the tank 21 is connected to the terminal ends of the first relief fluid tube 39a and second relief fluid tube 39b, and a relief valve V17 is interposed in the drain tube. In addition, the check valves V23 are interposed in the relief fluid tube 39a and the relief fluid tubes 39b. Meanwhile, the relief valves may be provided individually for each of the first output tube 41 and the second output tube 42.

Meanwhile, the hydraulic system of the working machine 1 according to the present embodiment includes a load sensing system. The load sensing system is a system configured to control the output flow rate of the first hydraulic pump 18 on the basis of the differential pressure between the discharge pressure of the first hydraulic pump 18 and the maximum load pressure of the traveling hydraulic actuators (the first traveling hydraulic actuators MR and ML) and the working hydraulic actuators (the dozer cylinder C1, the swing cylinder C2, the boom cylinder C3, the arm cylinder C4, and the bucket cylinder C5). More specifically, the load sensing system includes a pressure compensation valve V12 provided in each of the control valve V1 to V11, a regulator 20 for controlling a swash plate of the first hydraulic pump 18, a first unload valve V18 and a second unload valve V19, a PPS signal shuttle valve V14, and a PLS signal shuttle valve V15. In addition, the load sensing system employs a load sensing system of after-orifice type in which the pressure compensation valve V12 is arranged on the downstream side of the pressured fluid supply to the direction switching valves DV1 to DV11.

The load sensing system includes a PPS signal transmitting means for transmitting the output pressure of the first hydraulic pump 18 as the PPS signal pressure to the regulator 20 and includes a PLS signal transmitting means for transmitting the maximum load pressure, as the PLS signal pressure, of the load pressures of the control valves V1 to V11 to the regulator 20.

Figure 3:
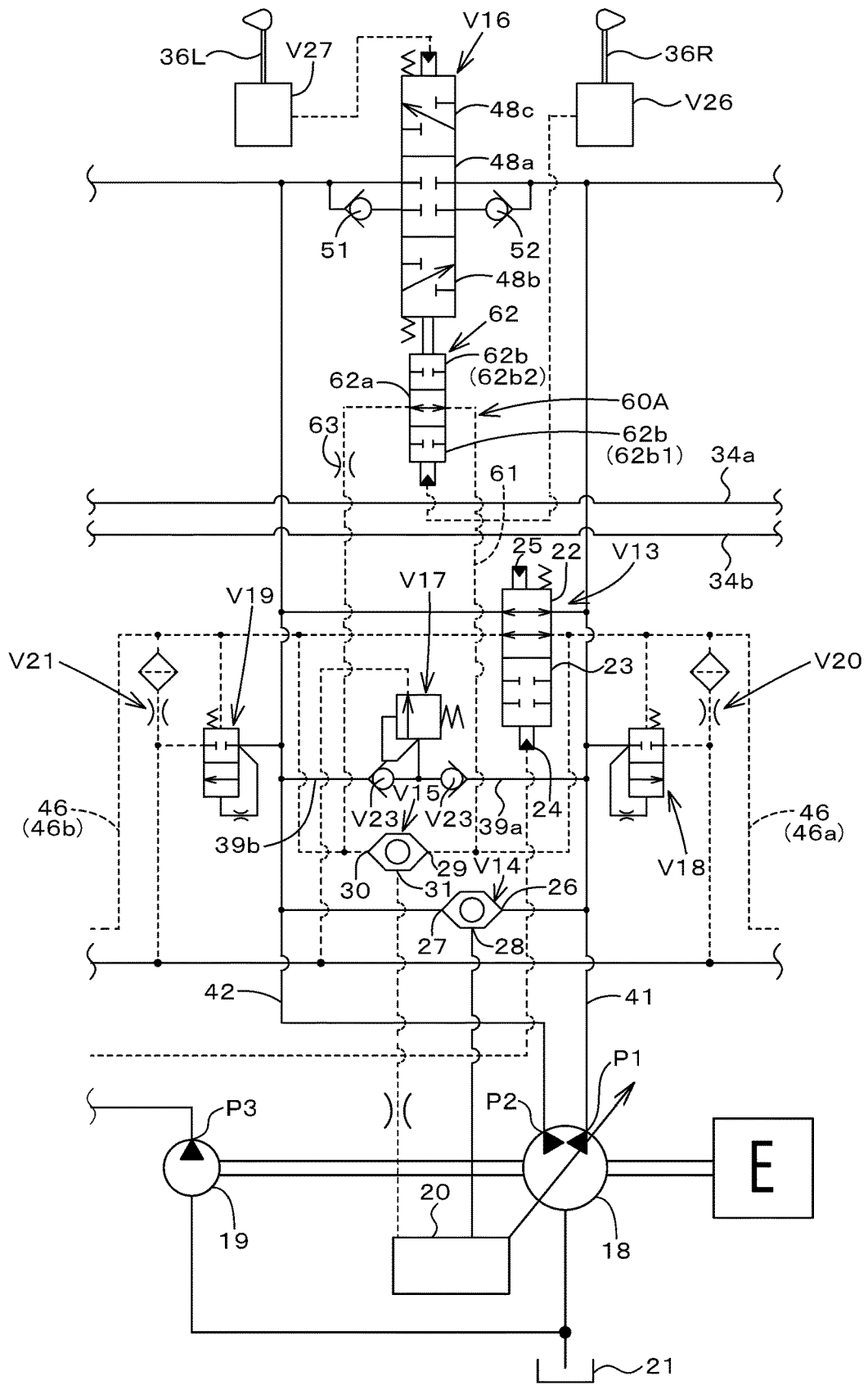
FIG. 3 is a view illustrating a detailed hydraulic circuit around a traveling independent valve according to the first embodiment.

The PPS signal transmitting means has a PPS signal shuttle valve V14. As shown in FIG. 3, an input port 26 of the PPS signal shuttle valve V14 is connected to the first output tube 41, an input port 27 of the PPS signal shuttle valve V14 is connected to the second output tube 42, the output port 28 of the PPS signal shuttle valve V14 is connected to the regulator 20. Thus, when the traveling independent valve V13 is in the confluence position 22, the first output tube 41 and the second output tube 42 of the first hydraulic pump 18 are in the same pressure, and the output pressure of the first hydraulic pump 18 is supplied from the opened one of the input ports 26 and 27 of the PPS signal shuttle valve V14 to the regulator 20.

In addition, when the traveling independent valve V13 is in the independent supply position 23, the higher one of the pressures of the first output tube 41 and the second output tube 42 is supplied to the regulator 20 via the PPS signal shuttle valve V14, or when the pressure of the first output tube 41 and the pressure of the second output tube 42 are equal to each other, the output pressure of the first hydraulic pump 18 is supplied from the opened one of the input ports 26 and 27 of the PPS signal shuttle valve V14 to the regulator 20.

The PLS signal transmission means has a PLS signal transmission fluid tube 46 for transmitting the load pressures of the control valves V1 to V11 and includes a PLS signal shuttle valve V15. The PLS signal transmission fluid tube 46 is connected to the pressure compensation valve V12 in the control valves V1 to V11. In addition, the PLS signal transmission fluid tube 46 crosses the traveling independent valve V13 in the inlet block.

The PLS signal transmission fluid tube 46 includes a first line 46a and a second line 46b. The first line 46a is a line connected to one of the input ports 29 of the traveling independent valve V13 and the shuttle valve V15 and extending from the PLS signal shuttle valve V15 to the first SP control valve V1. The second line 46b is a line connected to the other one of the input ports 30 of the traveling independent valve V13 and the PLS signal shuttle valve V15 and extending from the PLS signal shuttle valve V15 to the second SP control valve V11. When the traveling independent valve V13 is in the independent supply position 23, the first line 46a and the second line 46b are separated from each other, and when the traveling independent valve V13 is in the confluent position 22, the first line 46a and the second line 46b are connected to each other. Meanwhile, the output port 31 of the PLS signal shuttle valve V15 is connected to the regulator 20. Thus, when the traveling independent valve V13 is in the confluent position 22, the maximum load pressure of the hydraulic actuators controlled by each of the control valves V1 to V11 of the valve device CV is supplied to the regulator 20 from the opened one of the input ports 29 and 30 of the PLS signal shuttle valve V15. In addition, when the traveling independent valve V13 is in the independent supply position 23, the higher one of the pressures of the first line 46a and the second line 46b is supplied to the regulator 20, or when the pressure of the first line 46a and the pressure of the second line 46b are equal to each other, the pressure is supplied to the regulator 20 through the opened one of the input ports 29 and 30 of the PLS signal shuttle valve V15.

As described above, when the traveling independent valve V13 is set to the confluence position 22 by the PPS signal shuttle valve V14 and the PLS signal shuttle valve V15, the maximum load pressure of the hydraulic actuators ML, MR, and C3 to C5 and the output pressure of the hydraulic pump 18 can be transmitted to the regulator 20, and when the traveling independent valve V13 is in the independent supply position 23, the higher one of the load pressure of the travel motor MR of the first traveling device 3R and the load pressure of the hydraulic motor ML of the second traveling device 3L can be transmitted to the regulator 20, and the higher one of the output pressures of the first output port P1 and the second output port P2 can be transmitted to the regulator 20.

Figure 6:
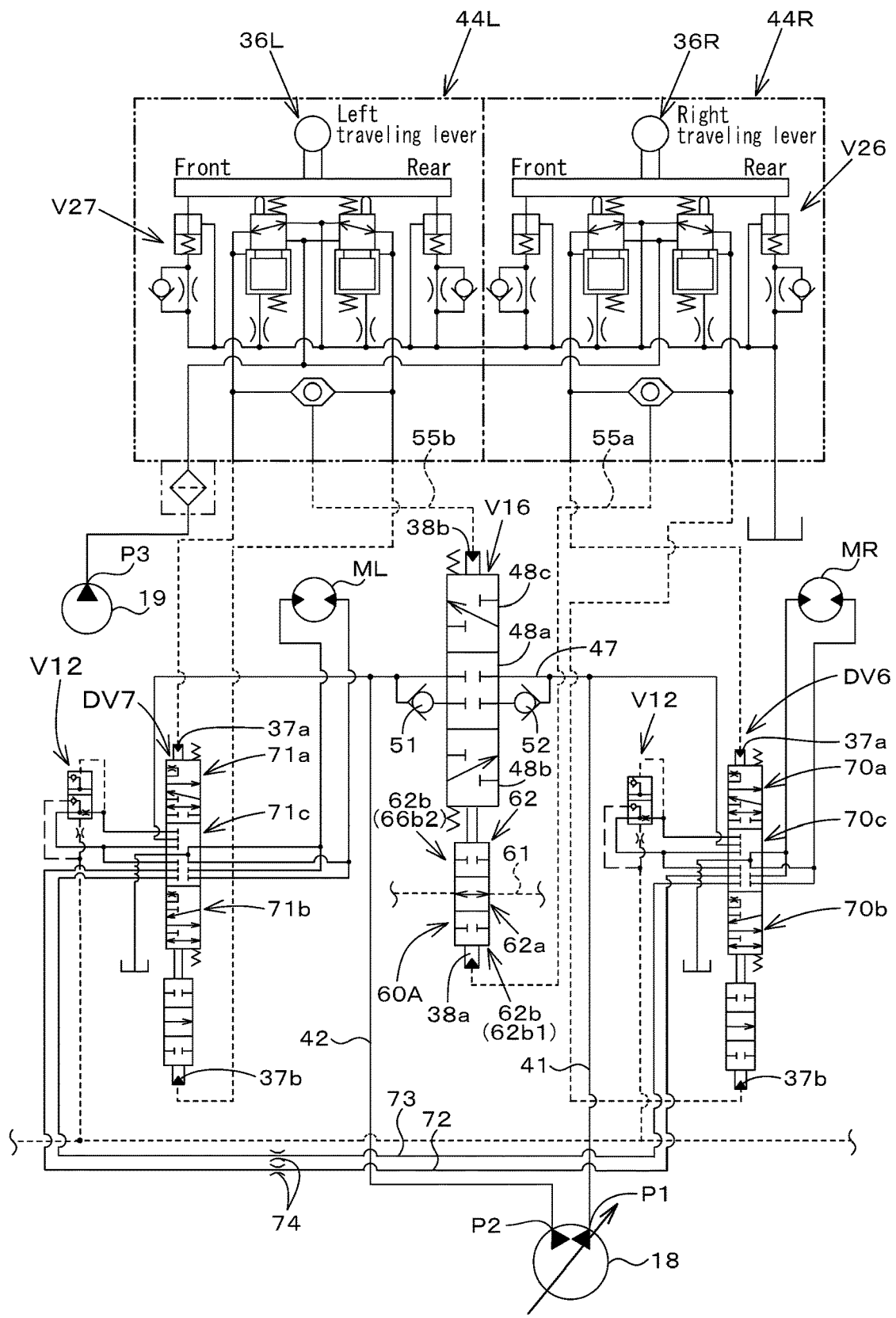
FIG. 6 is a view illustrating a hydraulic circuit for traveling according to the first embodiment.

As shown in FIG. 6, the hydraulic system includes a first operation device 44R for operating the first traveling device 3R and a second operation device 44L for operating the second traveling device 3L. The first operation device 44R has a right traveling operation valve V26 for adjusting the pilot pressure in accordance with the operation of the traveling lever 36R. The second operation device 44L has a left traveling operation valve V27 for adjusting the pilot pressure according to the operation of the traveling lever 36L. The right traveling operation valve V26 is constituted of a pilot valve for operating the first traveling device 3R, that is, the direction switching valve DV6 of the traveling control valve V6. The direction switching valve DV6 is a valve for controlling the pressured fluid to be supplied to the traveling motor MR. The direction switching valve DV6 is, for example, constituted of a three-position switching valve configured to be switched between a first position 70a, a second position 70b, and a neutral position 70c between the first position 70a and the second position 70b. When the pilot pressure adjusted by the right traveling operating valve V26 is applied to one of the pressure receiving portion 37a and the pressure receiving portion 37b in the direction switching valve DV6, the direction switching valve DV6 is switched from the neutral position 70c to the first position 70a or the second position 70b, and thereby the pressured fluid is supplied to the traveling motor MR.

The left traveling operation valve V27 is constituted of a pilot valve for operating the second traveling device 3L, that is, the direction switching valve DV7 of the traveling control valve V7. The direction switching valve DV7 is a valve for controlling the pressured fluid to be supplied to the traveling motor ML. The direction switching valve DV7 is, for example, constituted of a three-position switching valve configured to be switched between a first position 70a, a second position 70b, and a neutral position 70c between the first position 70a and the second position 70b. When the pilot pressure adjusted by the left traveling operating valve V27 is applied to one of the pressure receiving portion 37a and the pressure receiving portion 37b in the direction switching valve DV7, the direction switching valve DV7 is switched from the neutral position 70c to the first position 70a or the second position 70b, and thereby the pressured fluid is supplied to the traveling motor ML.

The hydraulic system is provided with a connecting fluid tube 72 for communicating the direction switching valve DV6 and the direction switching valve DV7 with each other in the case where the direction switching valve DV6 is in the first position 70a and the direction switching valve DV7 is in the first position 71a. In addition, the hydraulic system is provided with a coupling fluid tube 73 for communicating the direction switching valve DV6 and the direction switching valve DV7 with each other in the case where the direction switching valve DV6 is in the second position 70b and the direction switching valve DV7 is in the second position 71b. Each of the coupling fluid tubes 72 and 73 is provided with a throttle portion 74.

The traveling bypass valve V16 is constituted of a hydraulic switching valve configured to be switched by the pilot pressure of the right traveling operation valve V26 and the left traveling operation valve V27. The traveling bypass valve V16 is constituted of a switching valve of direct-acting spool type. The traveling bypass valve V16 is provided in the middle portion of the guide fluid tube 47 that connects the first output tube 41 and the second output tube 42 in parallel. That is, the traveling bypass valve V16 is provided in parallel with the traveling independent valve V13 between the first output tube 41 and the second output tube 42.

The traveling bypass valve V16 is configured to be switched between a blocking position (the neutral position) 48a, a first allowing position 48b, and a second allowing position 48c, the blocking position 48a blocking flow of the pressured fluid in the guide fluid tube 47, the first allowing position 48b allowing the pressured fluid on the second output tube 42 side to flow to the first output tube 41 through the guide fluid tube 47 and the check valve 51, the second allowing position 48c allowing the pressured fluid on the first output tube 41 side to flow to the second output tube 42 through the guide fluid tube 47 and the check valve 52.

The pressure receiving portions 38a of the traveling bypass valve V16 is connected to a first transmission fluid tube 55a connected to the right traveling operation valve V26, and the pressure receiving portion 38b of the traveling bypass valve V16 is connected to a second transmission fluid tube 55b connected to the left traveling operation valve V26. In this manner, in the case where the travel lever 36R is operated without operating the travel lever 36L (or when the operation amount of the travel lever 36R is larger than the operation amount of the travel lever 36L by a predetermined amount or more), the pilot pressure is applied to the pressure receiving portion 38a through the first transmission fluid tube 55a, and the traveling bypass valve V16 is switched to the first allowing position 48b. In addition, when the traveling lever 36L is operated without operating the traveling lever 36R (or the operation amount of the traveling lever 36L is larger than the operation amount of the traveling lever 36R by a predetermined amount or more), the pilot pressure is applied to the pressure receiving portion 38b through the second transmission fluid tube 55b, and the traveling bypass valve V16 is switched to the second allowing position 48c.

According to the above, by fully tilting the traveling levers 36R and 36L in one way in the front-rear direction (by moving the traveling lever 36L and the traveling lever 36R in one way in the full stroke), the pilot pressure from the traveling operation valves V26 and V27 is applied to the pressure receiving portions 37a of the direction switching valves DV6 and DV7 of the traveling control valves V6 and V7, the direction switching valves DV6 and DV7 are switched from the neutral positions 70c and 71c to one of the switching positions 70a and 71a, and the pressured fluid is supplied to the traveling motors ML and MR. In this manner, in the case where the traveling lever 36L and the traveling lever 36R are moved in one direction in the full stroke, the direction switching valve DV6 and the direction switching valve DV7 are communicated with each other by the coupling fluid tube 72, and thereby the pressured fluids to be supplied to the traveling motors ML and MR are equalized to improve the traveling straightness of the working machine 1.

In addition, by fully tilting the traveling levers 36R and 36L in the other way in the front-rear direction (by moving the traveling lever 36L and the traveling lever 36R in the other way in the full stroke), the pilot pressures from the traveling operation valves V26 and V27 are applied to the pressure receiving portions 37a of the direction switching valves DV6 and DV7 of the traveling control valves V6 and V7, the direction switching valves DV6 and DV7 are switched from the neutral positions 70c and 71c to one of the switching positions 70b and 71b, and the pressured fluid is supplied to the traveling motors ML and MR. In this manner, in the case where the traveling lever 36L and the traveling lever 36R are moved in the other direction in the full stroke, the direction switching valve DV6 and the direction switching valve DV7 are communicated with each other by the coupling fluid tube 73, and thereby the pressured fluids to be supplied to the traveling motors ML and MR are equalized to improve the traveling straightness of the working machine 1.

In addition, by tilting the traveling levers 36R and 36L one way or the other way in the front-rear direction by the same operation amount and by switching the direction switching valves DV6 and DV7, the pressured fluids are supplied to the traveling motors ML and MR, and thereby the work machine 1 can be caused to travel straight ahead.

For example, in the case of turning left from a straight traveling state, the right traveling operation valve V26 is operated so as to increase the revolution of the hydraulic motor MR of the first traveling device 3R. In that case, since the pilot pressure to be outputted from the right traveling operation valve V26 is higher than the pilot pressure to be outputted from the left traveling operation valve V27, the traveling bypass valve V16 is switched to the first allowing position 48b, and thereby the output fluid from the second output port P2 Flows from the second output tube 42 to the first output tube 41 through the guide fluid tube 47. Thus, in the case of the left turn, the pressured fluid supply system to the hydraulic motor MR of the first traveling device 3R is kept at a high pressure, and the flow rate of the first hydraulic pump 18 can be controlled on the basis of the PLS signal pressure from the right side and the PPS signal pressure. Thus, for example, even in a case of the traveling operation in which the pressured fluid supply system to the hydraulic motor ML of the first traveling device 3L tends to be pressured to be higher than the pressured fluid supply system to the hydraulic motor MR of the first traveling device 3R such as the left turn from the forward traveling advancing downward on a downhill, the turning can be preferably performed with the pressured fluid supply system to the hydraulic motor MR of the first traveling device 3R kept at a high pressure.

In addition, In the case of the right turn, the traveling bypass valve V16 is switched to the second allowing position 48c, and the output fluid from the first output port P1 flows from the first output tube 41 to the second output tube 42 through the guide fluid tube 47. In this manner, in the case of the right turn, the pressured fluid supply system to the hydraulic motor ML of the second traveling device 3L is kept at a high pressure, and the flow rate of the first hydraulic pump 18 can be controlled on the basis of the PLS signal pressure from the left side and the PPS signal pressure. Thus, for example, even in a case of the traveling operation in which the pressured fluid supply system to the hydraulic motor MR of the first traveling device 3R tends to be pressured to be higher than the pressured fluid supply system to the hydraulic motor ML of the first traveling device 3L such as the right turn from the forward traveling advancing downward on a downhill, the right turning can be preferably performed.

As shown in FIG. 2 and FIG. 3, the working machine (the hydraulic system) 1 is provided with a correction mechanism 60A. The correction mechanism 60A is configured to equalize both of the driving force of the traveling motor MR (the first traveling hydraulic actuator) and the driving force of the traveling motor ML (the second traveling hydraulic actuator) in performing the straight traveling operation in which the first operation device 44R and the second operation device 44 are operated in the same operation amount.

For example, in the case where the first traveling device 3R and the second traveling device 3L are operated simultaneously to perform the straight traveling, the correcting mechanism 60A corrects the pressure of the operating fluid (the pressured fluid) to be supplied to the traveling motor MR and the pressure of the operating fluid (the pressured fluid) to be supplied to the traveling motor ML.

The correcting mechanism 60A is configured to connect the first line 46a capable of transmitting the load pressure of the traveling motor MR and the second line 46b capable of transmitting the load pressure of the traveling motor ML at the time of straight traveling, whereby the traveling straightness of the working machine 1 is improved. In particular, the correction mechanism 60A has a signal bypass fluid tube 61 and a first correction switching valve 62. The signal bypass fluid tube 61 is a fluid tube that bypasses the first line 46a and the second line 46b, one end side is connected to the vicinity of the input port 29 of the PLS signal shuttle valve V15, and the other end side is connected to the vicinity of the input port 30 of the PLS signal shuttle valve V15. The signal bypass fluid tube 61 is provided with a throttle portion 63 for reducing a flow rate of the pressured fluid.

The first correction switching valve 62 is a switching valve provided in the middle portion of the signal bypass fluid tube 61, is switched to the communicating position 62a in the straight traveling operation and in the traveling neutral state (when neither the traveling levers 36R and 36L are operated), the communicating position 62a allowing the signal bypass fluid tube 61 to be communicated, and is switched to the blocking position 62b in the right turning operation and in the left turning operation (or when the operation amount of either one of the traveling levers 36R and 36L is larger than the operation amount of the other by a predetermined amount), the blocking position 62b blocking the signal bypass fluid tube 61. In particular, the first correction switching valve 62 is configured to be switched in synchronization with the switching of the traveling bypass valve V16, and the spool of the first correction switching valve 62 and the spool of the traveling bypass valve V16 are integrally formed. In the case where the traveling bypass valve V16 is in the blocking position 48a, the first correction switching valve 62 is switched to the communicating position 62a, in the case where the traveling bypass valve V16 is in the first allowing position 48b, the first correction switching valve 62 is switched to the first blocking position 62b1, and in the case where the traveling bypass valve V16 is in the second allowing position 48c, the first correction switching valve 62 is switched to the second blocking position 62b2.

As described above, in the case where the traveling levers 36R and 36L are operated with substantially the same operation amount in the section from the neutral position to the predetermined position less than the full operation (in the intermediate operational region) and thereby the working machine 1 is operated to travel straight, the first correction switching valve 62 is in the communicating position 62a when the spool of the traveling bypass valve V16 is in the neutral position (in the blocking position). Thus, the first line 46a for the PLS signal and the second line 46b for the PLS signal are communicated with each other through the signal bypass fluid tube 61, the pilot pressure for the PLS signal is made constant, and the pressured fluid to be supplied to the traveling motor MR and the pressured fluid to be supplied to the traveling motor ML are corrected so that the driving force of the traveling motor MR and the driving force of the traveling motor ML are substantially equal. Thus, the pressures of the fluid tubes are corrected to improve the traveling straightness of the working machine 1 even when there are a capacity difference of the fluid tube, a spool area difference, a leakage difference, and the like between the fluid tube extending from the first output port P1 of the first hydraulic pump 18 to the traveling motor MR through the first output tube 41 and the fluid tube extending from the second output port P2 to the traveling motor ML through the second output tube 42. That is, it is possible to improve the traveling straightness at the time of the intermediate operation of the working machine 1 (the traveling straightness of the working machine 1 of the case where the traveling levers 36R and 36L are operated in the straight traveling operation in the intermediate operation area). Here, in the case where fine adjustment is performed in the situation where the traveling levers 36R and 36L are being operated in the straight traveling operation, the unload leakage controls by the first unload valve V18 and the second unload valve V19 are equalized in both of the controls.

Second Embodiment

Figure 7:
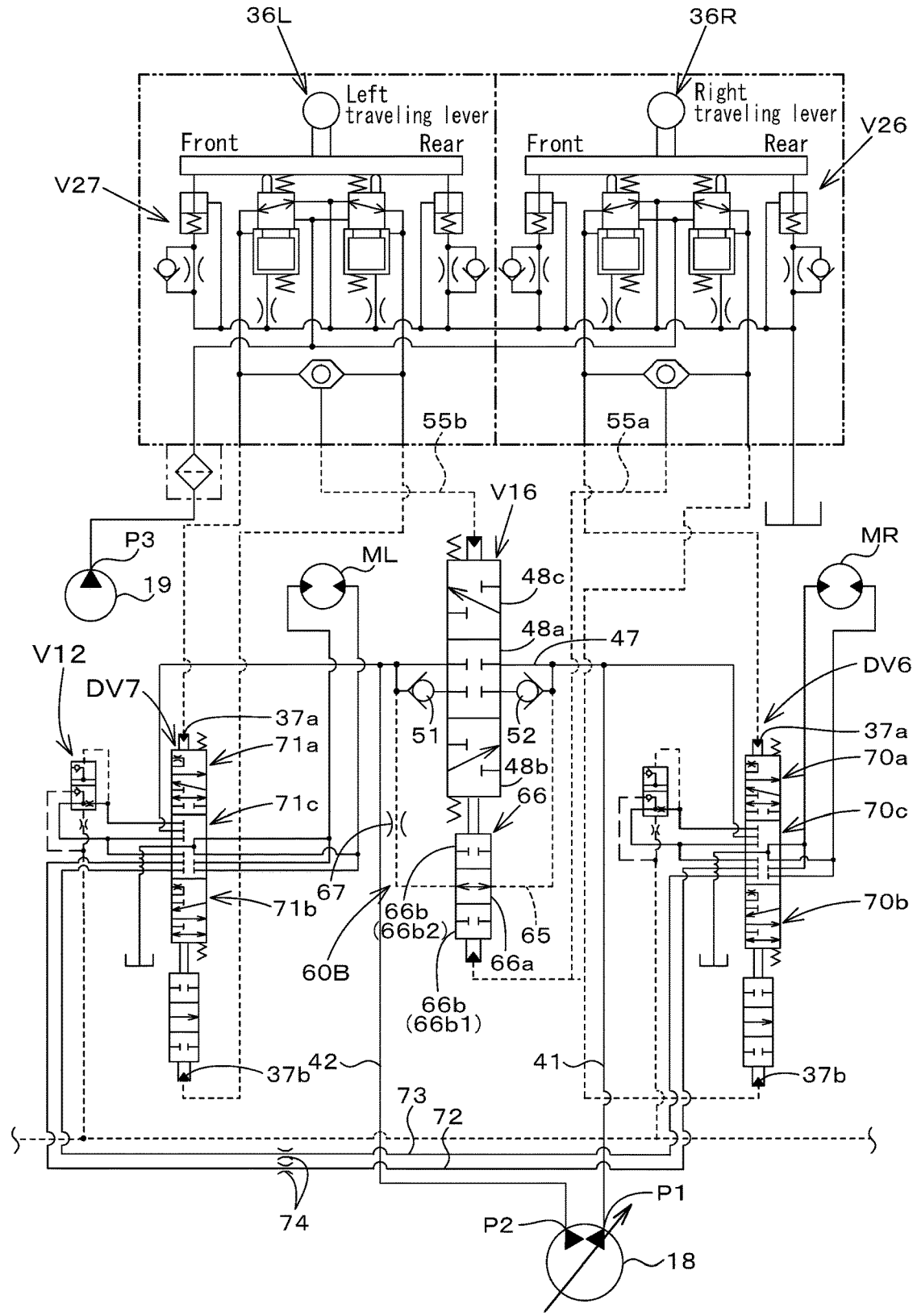
FIG. 7 is a view illustrating a hydraulic circuit for traveling according to a second embodiment of the present invention.

FIG. 7 shows a correction mechanism 60B according to a second embodiment of the present invention. It should be noted that the descriptions of the configurations same as those of the first embodiment will be omitted.

The correction mechanism 60B is configured to connect the first output tube 41 and the second output tube 42 to each other separately from the traveling independent valve V13, the first output tube 41 being connected to the first output port P1 of the first hydraulic pump 18, the second output tube 42 being connected to the second output port P2 of the first hydraulic pump 18, and thereby the traveling straightness of the working machine is improved.

In particular, the correction mechanism 60B includes an output bypass fluid tube 65 and a second correction switching valve 66. The discharge bypass fluid tube 65 is a fluid tube connecting the first output tube 41 and the second output tube 42 to each other, one end side of the discharge bypass fluid tube 65 is connected to one side (the first output tube 41 side) of the traveling bypass valve V16 in the guide fluid tube 47, and the other end side is connected to the other side (the second output tube 42 side) of the traveling bypass valve V16. The output bypass fluid tube 65 is provided with a throttle portion 67 for reducing the flow rate of pressured fluid.

The second correction switching valve 66 is a switching valve provided in the middle portion of the output bypass oil path 65, is switched to the communicating position 66a in the straight traveling operation and in the traveling neutral state (when neither the traveling levers 36R and 36L are operated), the communicating position 66a allowing the signal bypass fluid tube 65 to be communicated, and is switched to the blocking position 66b in the right turning operation and in the left turning operation (or when the operation amount of either one of the traveling levers 36R and 36L is larger than the operation amount of the other by a predetermined amount), the blocking position 66b blocking the signal bypass fluid tube 65. In particular, the second correction switching valve 66 is configured to be switched in synchronization with the switching of the traveling bypass valve V16, and the spool of the second correction switching valve 66 and the spool of the traveling bypass valve V16 are integrally formed. In the case where the traveling bypass valve V16 is in the blocking position 48a, the second correction switching valve 66 is switched to the communicating position 66a, in the case where the traveling bypass valve V16 is in the first allowing position 48b, the second correction switching valve 66 is switched to the first blocking position 66b1, and in the case where the traveling bypass valve V16 is in the second allowing position 48c, the second correction switching valve 66 is switched to the second blocking position 66b2.

As described above, in the case where the traveling levers 36R and 36L are operated with substantially the same operation amount in the section from the neutral position to the predetermined position less than the full operation (in the intermediate operational region) and thereby the working machine 1 is operated to travel straight, the second correction switching valve 66 is in the communicating position 66a when the spool of the traveling bypass valve V16 is in the neutral position (in the blocking position). Thus, the first output tube 41 and the second output tube 42 are communicated with each other through the output bypass fluid tube 65, the pressures of the first output tube 41 and the second output tube 42 are made constant. In this manner, the pressure of the operation fluid to be supplied to the traveling motor MR and the pressure of the operation fluid to be supplied to the traveling motor ML are corrected to equalize the driving force of the traveling motor MR and the driving force of the traveling motor ML even when there are a flow rate difference of the fluid tube, a displacement difference between the traveling motors MR and ML, a spoor area difference, a leakage difference, and the like between the fluid tube extending from the first output port P1 of the first hydraulic pump 18 to the traveling motor MR through the first output tube 41 and the fluid tube extending from the second output port P2 to the traveling motor ML through the second output tube 42, and thereby the traveling straightness of the working machine 1 is improved.

Third Embodiment

Figure 8:
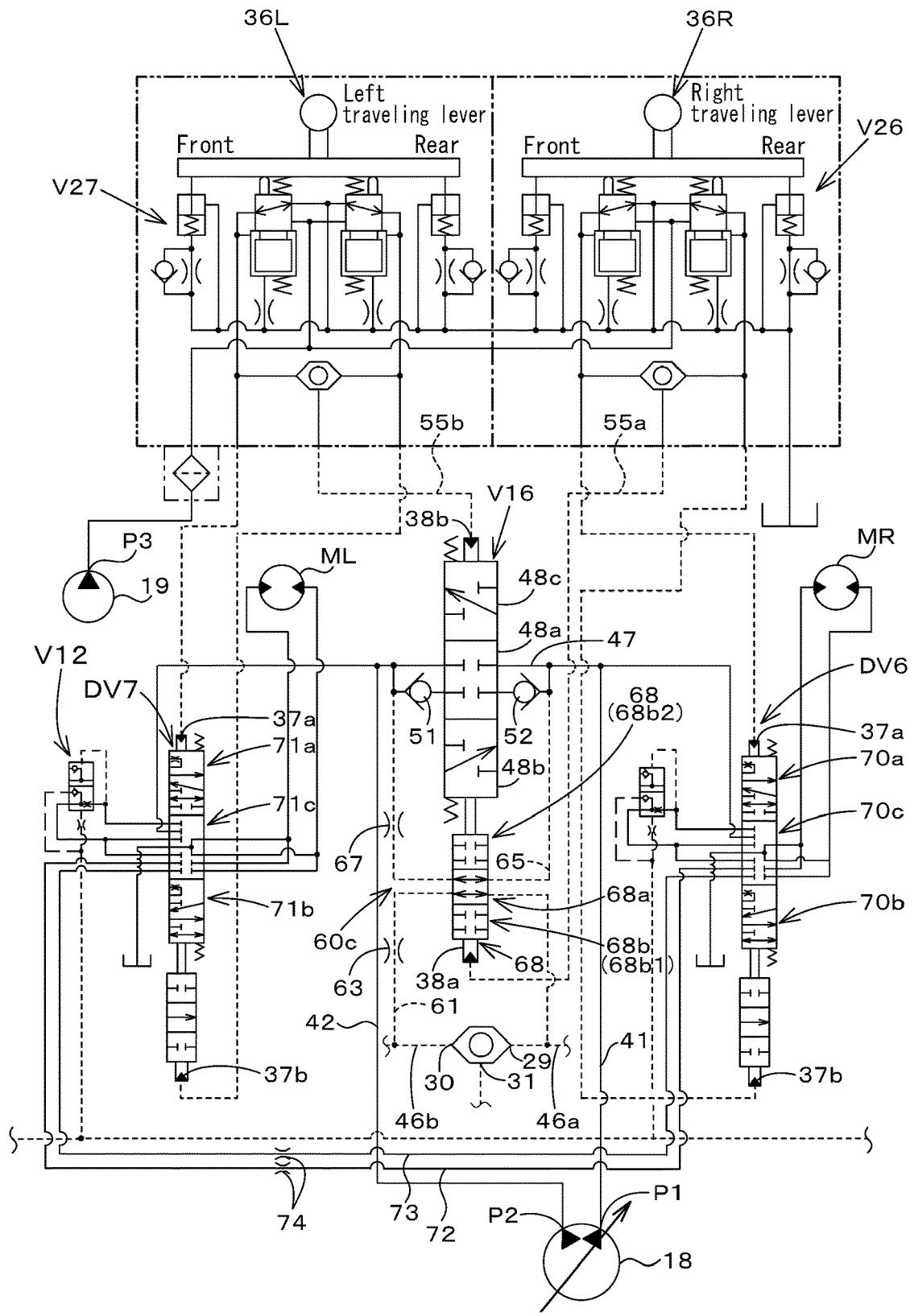
FIG. 8 is a view illustrating a hydraulic circuit for traveling according to a third embodiment of the present invention.

FIG. 8 shows a correction mechanism 60C according to a third embodiment of the present invention. It should be noted that the descriptions of the configurations same as those of the first embodiment and the second embodiment will be omitted.

The correction mechanism 60C connects the first line 46a and the second line 46b to each other at the time of straight traveling and connects the first output tube 41 and the second output tube 42 to each other, thereby improving the traveling straightness of the working machine 1. In particular, the correction mechanism 60C has a signal bypass fluid tube 61, an output bypass fluid tube 65, and a third correction switching valve 68. The signal bypass fluid tube 61A is provided with a throttle portion 63, and the discharge bypass fluid tube 65 is provided with a throttle portion 67.

The third correction switching valve 68 is a switching valve provided in the middle portion of the output bypass fluid tube 65, is switched to the communicating position 68a in the straight traveling operation and in the traveling neutral state (when neither the traveling levers 36R and 36L are operated), the communicating position 62a allowing both of the signal bypass fluid tube 61 and the output bypass fluid tube 65 to be communicated, and is switched to the blocking position 68b in the right turning operation and in the left turning operation (or when the operation amount of either one of the traveling levers 36R and 36L is larger than the operation amount of the other by a predetermined amount), the blocking position 68b blocking both of the signal bypass fluid tube 61 and the output bypass fluid tube 65. In particular, the third correction switching valve 68 is configured to be switched in synchronization with the switching of the traveling bypass valve V16, and the spool of the third correction switching valve 68 and the spool of the traveling bypass valve V16 are integrally formed. In the case where the traveling bypass valve V16 is in the blocking position 48a, the third correction switching valve 68 is switched to the communicating position 68a, and in the case where the traveling bypass valve V16 is in the first allowing position 48b, the third correction switching valve 68 is switched to the first blocking position 68b1, and further in the case where the traveling bypass valve V16 is in the second allowing position 48c, the third correction switching valve 68 is switched to the second blocking position 68b2.

As described above, in the case where the traveling levers 36R and 36L are operated with substantially the same operation amount from the neutral position in the intermediate operational region and thereby the working machine 1 is operated to travel straight, the third correction switching valve 68 is in the communicating position 68a when the spool of the traveling bypass valve V16 is in the neutral position (in the blocking position). Thus, not only the first line 46a for the PLS signal and the second line 46b for the PLS signal are communicated with each other through the signal bypass fluid tube 61, but also the first output tube 41 and the second output tube 42 are communicated with each other by the output bypass fluid tube 65. In this manner, the driving force of the traveling, motor MR and the driving force of the traveling motor ML can be provided equally, thereby the traveling straightness of the working machine 1 is improved.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims. For example, the traveling bypass valve V16 is switched by the pilot fluid from the traveling operation valves V26 and V27; however, the operations of the traveling levers 36R and 36L may be detected by the detection device, and then the traveling bypass valve V16 may be electrically switched on the basis of the detected signal. That is, the travel operation valves V26 and V27 may be constituted of sensors configured to detect the operations of the traveling levers 36R and 36L, and the traveling bypass valve V16 may be constituted of an electromagnetic switching valve configured to be switched on the basis of the sensors. In addition, the first correction switching valve 62, the second correction switching valve 66, and the third correction switching valve 68 may also be constituted of the electromagnetic switching valves that are configured to be electrically switched. In that case, either one of the traveling bypass valve V16 and the correction switching valve (the first correction switching valve 62, the second correction switching valve 66) may be constituted of the electromagnetic switching valve, or both of the traveling bypass valve V16 and the correction switching valve may be constituted of the electromagnetic switching valve.

What is claimed is:

1. A working machine comprising:
   a hydraulic pump;
   a first traveling device to be driven by a first traveling hydraulic actuator;
   a second traveling device to be driven by a second traveling hydraulic actuator;
   a first output tube to connect a first output port of the hydraulic pump to the first traveling hydraulic actuator;
   a second output tube to connect a second output port of the hydraulic pump to the second traveling hydraulic actuator;
   a first operation device to operate the first traveling device;
   a second operation device to operate the second traveling device;
   a correction mechanism to equalize a driving force of the first traveling hydraulic actuator and another driving force of the second traveling hydraulic actuator when the first operation device and the second operation device are operated each at same operation extents to perform a straight-traveling operation; and
   a traveling bypass valve to be switched between:
      a blocking position blocking, in the straight-traveling operation, supply of a pressured fluid between the first output tube and the second output tube;
      a first switching position, in a right-turning operation, allowing the pressured fluid to flow from the second output tube to the first output tube and blocking the pressured fluid from flowing from the first output tube to the second output tube; and
      a second switching position, in a left-turning operation, allowing the pressured fluid to flow from the first output tube to the second output tube and blocking the pressured fluid from flowing from the second output tube to the first output tube.

2. A working machine, comprising:
   a hydraulic pump;
   a first traveling device to be driven by a first traveling hydraulic actuator;
   a second traveling device to be driven by a second traveling hydraulic actuator;
   a first output tube to connect a first output port of the hydraulic pump to the first traveling hydraulic actuator;
   a second output tube to connect a second output port of the hydraulic pump to the second traveling hydraulic actuator;
   a first operation device to operate the first traveling device;
   a second operation device to operate the second traveling device;
   a correction mechanism to equalize a driving force of the first traveling hydraulic actuator and another driving force of the second traveling hydraulic actuator when the first operation device and the second operation device are operated each at same operation extents to perform a straight-traveling operation;
   a working device to be driven by a working hydraulic actuator; and
   a traveling independent valve to be switched between:
      a confluent position allowing the pressured fluid from the first output port and the pressured fluid from the second output port to be confluent with each other and allowing the pressured fluids to be supplied to the first traveling hydraulic actuator, the second traveling hydraulic actuator, and the working hydraulic actuator; and
      an independent supply position independently allowing the pressured fluid from the first output port to be supplied to the first traveling hydraulic actuator and independently allowing the pressured fluid from the second output port to be supplied to the second traveling hydraulic actuator; and
   a load sensing system to control an output flow rate of the hydraulic pump based on a differential pressure between a highest load pressure of the second traveling hydraulic actuator and the working hydraulic actuator and an output pressure of the hydraulic pump,
wherein the correction mechanism connects a first line to a second line in the straight-traveling operation,
the first line being configured to transmit a load pressure of the first traveling hydraulic actuator,
the second line being configured to transmit a load pressure of the second traveling hydraulic actuator.

3. The working machine according to claim 2,
wherein the correction mechanism includes:
a signal bypass fluid tube connecting the first line to the second line; and
a first correction switching valve arranged on the signal bypass fluid tube and configured to be switched between a communicating position and a blocking position,
the communicating position allowing the signal bypass fluid tube to be opened in the straight-traveling operation,
the blocking position allowing the signal bypass fluid tube to be closed in the right-turning operation and the left-turning operation.

4. The working machine according to claim 3,
wherein the signal bypass fluid tube includes
a throttle portion to reduce a flow rate of the pressured fluid.

5. The working machine according to claim 1, comprising
a load sensing system to control an output flow rate of the hydraulic pump based on a differential pressure between a highest load pressure of the second traveling hydraulic actuator and the working hydraulic actuator and an output pressure of the hydraulic pump,
wherein the correction mechanism includes:
a signal bypass fluid tube connecting a first line to a second line,
the first line being configured to transmit a load pressure of the first traveling hydraulic actuator,
the second line being configured to transmit a load pressure of the second traveling hydraulic actuator; and
a first correction switching valve arranged on the signal bypass fluid tube and configured to be switched between a communicating position and a blocking position,
the communicating position allowing the signal bypass fluid tube to be opened in the straight-traveling operation,
the blocking position allowing the signal bypass fluid tube to be closed in the right-turning operation and the left-turning operation,
wherein a spool of the traveling bypass valve and a spool of the first correction switching valve are integrally provided.

6. The working machine according to claim 5,
wherein the signal bypass fluid tube includes
a throttle portion to reduce a flow rate of the pressured fluid.

7. A working machine, comprising:
a hydraulic pump;
a first traveling device to be driven by a first traveling hydraulic actuator;
a second traveling device to be driven by a second traveling hydraulic actuator;
a first output tube to connect a first output port of the hydraulic pump to the first traveling hydraulic actuator;
a second output tube to connect a second output port of the hydraulic pump to the second traveling hydraulic actuator;
a first operation device to operate the first traveling device;
a second operation device to operate the second traveling device; and
a correction mechanism to equalize a driving force of the first traveling hydraulic actuator and another driving force of the second traveling hydraulic actuator when the first operation device and the second operation device are operated each at same operation extents to perform a straight-traveling operation,
wherein the correction mechanism connects the first output tube to the second output tube in the straight-traveling operation.

8. The working machine according to claim 7,
wherein the correction mechanism includes:
an output bypass fluid tube connecting the first output tube to the second output tube; and
a second correction switching valve arranged on the output bypass fluid tube and configured to be switched between a communicating position and a blocking position,
the communicating position allowing the output bypass fluid tube to be opened in the straight-traveling operation,
the blocking position allowing the output bypass fluid tube to be closed in the right-turning operation and the left-turning operation.

9. The working machine according to claim 1,
wherein the correction mechanism includes:
an output bypass fluid tube connecting the first output tube to the second output tube; and
a second correction switching valve arranged on the output bypass fluid tube and configured to be switched between a communicating position and a blocking position,
the communicating position allowing the output bypass fluid tube to be opened in the straight-traveling operation,
the blocking position allowing the output bypass fluid tube to be closed in the right-turning operation and the left-turning operation,
and wherein a spool of the traveling bypass valve and a spool of the second correction switching valve are integrally provided.

10. The working machine according to claim 2,
wherein the correction mechanism includes:
a signal bypass fluid tube connecting the first line to the second line;
an output bypass fluid tube connecting the first output tube to the second output tube; and
a third correction switching valve arranged on the signal bypass fluid tube and the output bypass fluid tube and configured to be switched between a communicating position and a blocking position,
the communicating position allowing the signal bypass fluid tube and the output bypass fluid tube to be opened in the straight-traveling operation,
the blocking position allowing the signal bypass fluid tube and the output bypass fluid tube to be closed in the right-turning operation and the left-turning operation.

11. The working machine according to claim 8,
wherein the output bypass fluid tube includes a throttle portion to reduce a flow rate of the pressured fluid.

12. The working machine according to claim 9, wherein the output bypass fluid tube includes
a throttle portion to reduce a flow rate of the pressured fluid.

13. The working machine according to claim 10, wherein the output bypass fluid tube includes
a throttle portion to reduce a flow rate of the pressured fluid.

* * * * *